United States Patent [19]

Hukagawa et al.

[11] 4,272,671
[45] Jun. 9, 1981

[54] TEMPERATURE CONTROL SYSTEM FOR ELECTRIC SURFACE HEATER

[75] Inventors: Hitoshi Hukagawa, Kodoma; Isao Shimada, Yahata; Masayuki Naruo, Hirakata; Terumi Endo, Shijonawate, all of Japan

[73] Assignee: Matsushita Electric Works, Ltd., Osaka, Japan

[21] Appl. No.: 75,991

[22] Filed: Sep. 17, 1979

[30] Foreign Application Priority Data

Sep. 15, 1978 [JP] Japan .................... 53-113877

[51] Int. Cl.³ .............................. H05B 1/02
[52] U.S. Cl. ................... 219/505; 219/212; 219/504; 219/528; 219/518; 340/310 A
[58] Field of Search ............... 219/504, 505, 501, 503, 219/497, 494, 498, 212, 528, 549, 518; 340/310 A, 310 R; 307/117

[56] References Cited

U.S. PATENT DOCUMENTS

| | | | |
|---|---|---|---|
| 3,103,573 | 9/1963 | Niehaus | 219/498 |
| 3,270,184 | 8/1966 | Negromanti | 219/505 |
| 3,330,936 | 7/1967 | Fickweiler | 219/212 |
| 3,400,251 | 9/1968 | Coyle et al. | 219/503 |
| 3,462,585 | 8/1969 | Somers | 219/501 |
| 3,697,812 | 10/1972 | Hehl | 219/501 |
| 3,972,471 | 8/1976 | Ziegler | 340/310 A |
| 4,074,335 | 2/1978 | Takasugi | 219/503 |
| 4,093,847 | 6/1978 | Walker et al. | 219/501 |
| 4,186,873 | 2/1980 | Geisler et al. | 340/310 A |

Primary Examiner—Elliot Goldberg
Assistant Examiner—M. Paschall
Attorney, Agent, or Firm—Burns, Doane, Swecker & Mathis

[57] ABSTRACT

A temperature control system for electric surface heater of piled layers of a heating element across which a commercial AC source current is fed and a thermosensitive electrode opposing the element through thermosensitive element showing negative impedance characteristics with temperature rise. In the system, an AC signal voltage different from the source current is applied between the heating element and the thermosensitive electrode, and excessive variations in the signal voltage responsive to the negative impedance of the thermosensitive element is detected to disconnect or connect the heating element and the source.

9 Claims, 11 Drawing Figures

TEMPERATURE CONTROL SYSTEM FOR ELECTRIC SURFACE HEATER

BACKGROUND OF THE INVENTION

This invention relates to temperature control systems for electric surface heater.

In FIG. 1, there is shown in a schematic cross-section a conventional electric surface heater A, in which insulating layers 4 are placed in piles on respective surfaces of a layer of series connected filmy heating elements 1, a thermosensitive electrode 3a formed of such metal foil as an aluminum foil and a thermosensitive element 2 made of such sheet-shaped and electrically semiconducting plastics as a nylon resin and having a negative impedance characteristic with respect to temperature variations are placed on one of the insulating layers 4 sequentially in piles, and another thermosensitive electrode 3b is further placed on the element 2 which is also covered with another insulating layer 4. In using this heater A, a voltage is applied between the two thermosensitive electrodes 3a and 3b that holding the thermosensitive element 2 between them and any impedance variations of the thermosensitive element 2 is detected to determine and control the temperature of the heating elements 1.

In this case, a voltage of the same frequency as of the commercial current source voltage applied to the heating elements 1 is used for the voltage applied between the respective thermosensitive electrodes 3a and 3b.

The surface heater of the type shown in FIG. 1 is thus complicated in structure and high in production costs, and different type surface heaters respectively having such a simpler structure as shown in FIG. 2 or 3 have been suggested.

The heater shown in FIG. 2 is formed by placing sequentially in piles an insulating layer 4, layer of heating elements 1, thermosensitive element 2, thermosensitive electrode 3 and insulating layer 4 in the order of thus mentioned. The heater shown in FIG. 3 is substantially of the same structure as in FIG. 2, except that the thermosensitive electrodes 3' of the same shape and of the same number as of the heating elements 1 are disposed above the respective heating elements 1 to oppose each other. In these surface heaters of FIGS. 2 and 3, a signal voltage for detecting the impedance variation of the thermosensitive element 2 is applied between the thermosensitive electrode 3 or electrodes 3' and the heating elements 1.

These heaters of FIGS. 2 and 3 are of simpler structures resulting in lower manufacturing costs than in the case of the heater of FIG. 1 and are widely employed recently in combination with various type temperature control systems. Since the impedance variation detecting signal of the same frequency as the commercial source voltage is employed in these control systems similarly to the case of FIG. 1, however, there arise such problems that, due to the commercial source voltage applied to the heating elements 1, a potential of about half of the source voltage is provided to the thermosensitive electrode 3 or electrodes 3' coupled to the heating elements through the thermosensitive element 2 and the detecting signal applied between the heating elements 1 and the electrode 3 or electrodes 3' is influenced by such potential, and further that, once a short circuiting is caused to take place due to, for example, a metal made pin or the like stuck accidentally through the thermosensitive electrode and a substantially middle part of the heating elements being at the same potential as that of the thermosensitive electrode, or when a local excessive heat rise occurs at such middle part due to an external heat insulation by a cushion or the like placed on the particular part, any variation in the detecting signal for detecting the impedance variation can no longer be detected and to avoid such troubles the control system is provided with a leakage detecting function and the like, whereby the system is required to become rather expensive notwithstanding the lowered costs for the heater. The present invention has been suggested to eliminate these problems.

OBJECTS OF THE INVENTION

A primary object of the present invention is, therefore, to provide a temperature control system for an electric surface heater wherein the heating element is utilized as a thermosensitive electrode and yet no misoperation is caused under the influence of the commercial source voltage.

Another object of the present invention is to provide a temperature control system for an electric surface heater which prevents any electric shock from occurring to users due to an accidental short circuit.

Still another object of the present invention is to provide a temperature control system wherein, even if switching contacts for the heating elements are fused to be always closed or a switching circuit or the like gets out of order, any excess rise in the heater temperature can be effectively prevented.

Other objects and advantages of the present invention shall be made clear as the following disclosure of the invention advances while being detailed with reference to preferred embodiments shown in accompanying drawings, in which.

DETAILED DESCRIPTION

While the present invention is thus explained with reference to the illustrated embodiments, the intention is not to limit the invention to these embodiments but to include all modifications, alterations and equivalent arrangements possible within the scope of appended claims.

Figure 1:
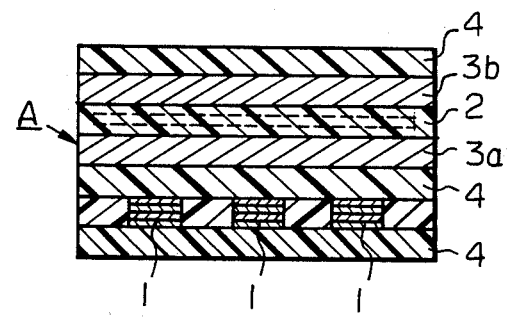
FIG. 1 shows in a sectioned view a structure of conventional electric surface heater.
Figure 2:
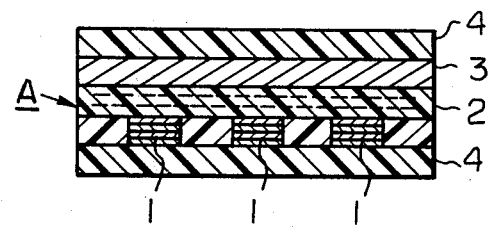
FIGS. 2 and 3 show also in a sectioned view other structures of the electric surface heater which are currently generally used and to which the present invention is applied.
Figure 3:
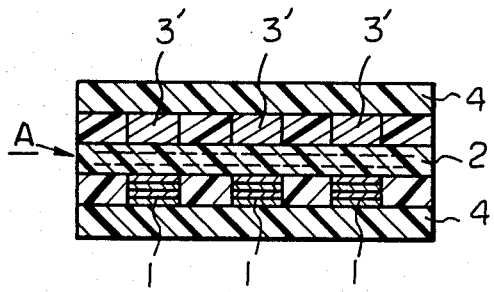
Figure 4:
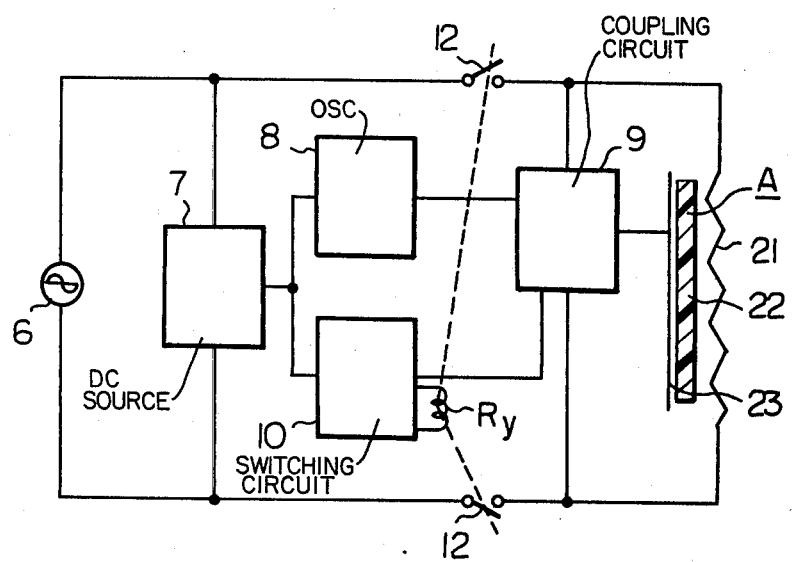
FIG. 4 is a block diagram of the temperature control system of the present invention.

Referring now to FIG. 4, the temperature control system of the present invention for the electric surface heater generally comprises a commercial alternating current source 6, a direct current source circuit 7, an oscillating circuit 8, a coupling circuit 9, a switching circuit 10, a relay winding Ry operated by outputs of the switching circuit 10 and controlling contacts 12 opened and closed by the relay winding Ry.

An electric surface heater A comprises a heating element 21, a thermosensitive electrode 23 and a thermosensitive element 22 disposed between the element 21 and the electrode 23. The heating element 21 is connected at both ends to the commercial alternating current source 6 respectively through the controlling contacts 12. The oscillating circuit 8 operated by the direct current voltage fed from the direct current source circuit 7 generates a signal voltage of a frequency which is different from the commercial current source frequency, being such as 500 Hz to 1 KHz, and provides the signal voltage to the coupling circuit 9. This coupling circuit 9 applies the signal voltage between the heating element 21 and the thermosensitive electrode 23 opposed to the heating element 21 through the thermosensitive element 22 and provides any variation in the signal voltage applied between the thermosensitive electrode 23 and the heating element 21, due to any impedance variation in the thermosensitive element 22 depending on temperature variation, to the switching circuit 10. In the switching circuit 10, the variation of the signal voltage denoting the temperature variation of the heating element 21 is obtained as information and, not only in the case when the temperature of the heating element 21 becomes higher than an upper set value but also in an abnormal case where a conductive pin or the like is accidentally struck into the surface heater so as to short-circuit between the thermosensitive electrode 23 and the heating element 21, the relay winding Ry will be operated to switch off the controlling contacts 12 and, in case the temperature of the heater becomes lower than a lower set value, on the contrary, the controlling contacts 12 will be switched on by the relay winding Ry so that the commercial source current will be fed to the heating element 21.

Figure 5:
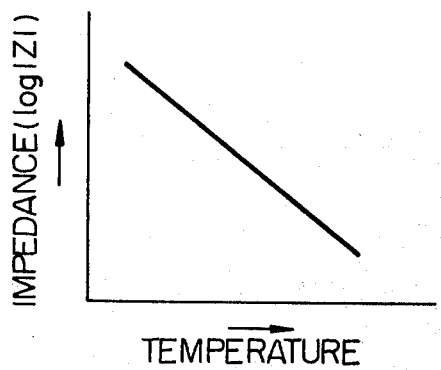
FIG. 5 is a diagram showing relations between temperature variations of the heating element and impedance variations in the thermosensitive element of the heater.

FIG. 5 shows the relation between the temperature variation and the impedance variation. Semiconducting nylon or the like having negative characteristics with respect to temperature rise is used as the thermosensitive element so that the impedance of the thermosensitive electrode will reduce as the temperature rises as seen in FIG. 5.

Preferred embodiments of the respective circuits in the above described block diagram of FIG. 4 shall be referred to in the following.

Figure 6:
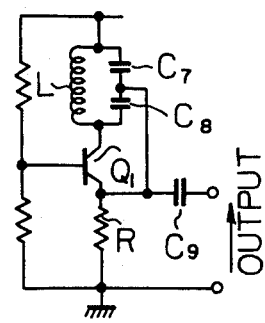
FIG. 6 shows an embodiment of oscillating circuit employed in the system of FIG. 4.

FIG. 6 shows an example of the oscillating circuit 8, which is a known Colpitts oscillator that oscillates at a frequency determined by the inductance of coil L and capacitance of respective capacitors $C_7$ and $C_8$. Oscillated output is obtained at both ends of an emitter resistance R of a transistor $Q_1$ and is fed to the coupling circuit 9 through a coupling capacitor $C_9$.

Figure 7:
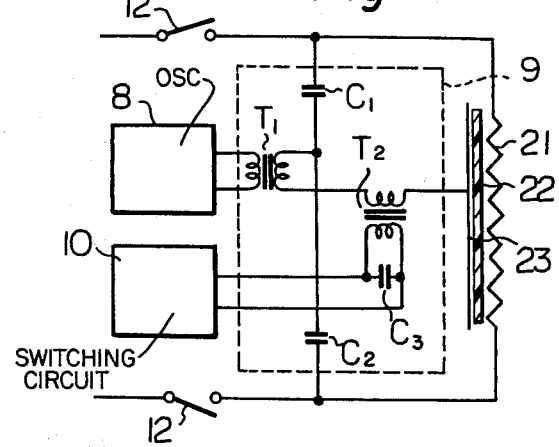
FIGS. 7 and 8 show embodiments of a coupling circuit for coupling the oscillating circuit with a switching circuit in the system of FIG. 4.

FIG. 7 shows an example of the coupling circuit 9, in which the signal voltage of a frequency different from the commercial source current frequency which is the output of the oscillating circuit 8 is isolated by a transformer $T_1$ and is fed to the thermosensitive electrode 23 through the primary winding of a transformer $T_2$. The transformer $T_1$ is connected at one end on the secondary side to a source current lines connecting the source to the both ends of the heating element 21 through the capacitors $C_1$ and $C_2$ and at the other end to the thermosensitive electrode 23 through the primary winding of the transformer $T_2$. The winding on the secondary side of this transformer $T_2$ forms a parallel resonant circuit for the frequency of the oscillator 8 oscillated by the capacitor $C_3$ and resonates with the frequency composition of the signal voltage. A signal voltage determined by the ratio of the impedance of the thermosensitive element 22 and the impedance of the value of the resonant impedance on the secondary side of the transformer $T_2$ as compared to the primary side among the signal voltages applied between the thermosensitive electrode 23 and the heating element 21 through the transformer $T_1$ is obtained in the primary winding of the transformer $T_2$, and this signal voltage is transmitted to the secondary side of the transformer $T_2$ and provided to the switching circuit 10. In this case, the capacitors $C_1$ and $C_2$ act as coupling capacitors in which the impedance is low for the frequency of the signal voltage but high for the commercial source current frequency.

Figure 8:
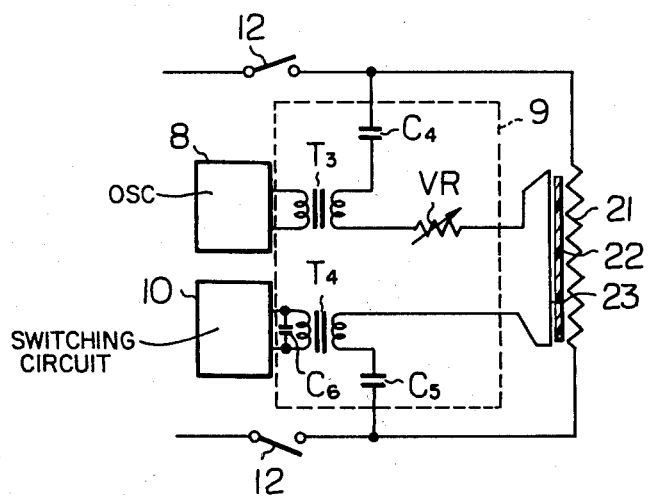

FIG. 8 shows another embodiment of the coupling circuit 9, in which the signal voltage of a frequency different from the commercial source current frequency which is the output of the oscillating circuit 8 is fed between the thermosensitive electrode 23 and the heating element 21 through a transformer $T_3$. This transformer $T_3$ is connected at one end of the secondary winding to one of the current source lines through a capacitor $C_4$ and at the other end to the thermosensitive electrode 23 through a variable resistor VR. Between the thermosensitive electrode 23 and the heating element 21, further, the primary winding of a transformer $T_4$ which is resonated with the signal voltage frequency by a parallel resonating capacitor $C_6$ on the secondary side is connected. The secondary side of the transformer $T_4$ is made to have a resonating impedance sufficiently higher than that of the thermosensitive element 22 at the frequency of the signal voltage. A voltage determined by the divided voltage ratio divided by the resistance value of the variable resistor VR and the impedance of the thermosensitive element 22 is added to the signal voltage applied between the thermosensitive electrode 23 and the heating element 21. The variation of the impedance due to the temperature variation of the thermosensitive element 22 is provided to the switching circuit 10 through a transformer $T_4$ as a variation of the signal voltage. In this case, the set temperature range can be adjusted by the variable resistor VR and, due to the interruption of input to the transformer $T_4$ caused by a disconnection between the thermosensitive electrode 23 and the transformer $T_3$ or between the thermosensitive electrode 23 and the transformer $T_4$, or by a breakage of the thermosensitive electrode itself, and due to an input interruption to the transformer $T_4$ caused by a short-circuit between the heating element 21 and the thermosensitive electrode 23, the switching circuit 10 will be operated to switch off the controlling contacts 12.

Figure 9:
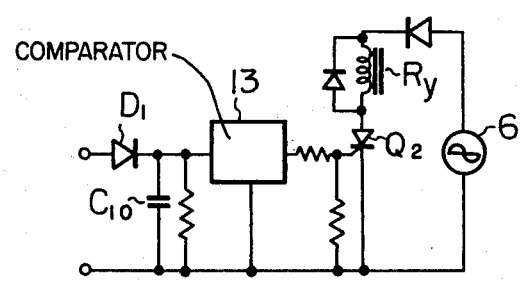
FIG. 9 is an embodiment of the switching circuit in the system of FIG. 4.

FIG. 9 shows an example of the switching circuit 10, in which the signal voltage provided from the above described coupling circuit 9 is rectified and smoothed by a diode $D_1$ and capacitor $C_{10}$ and is provided to a comparator 13. This comparator 13 switches its output to be on the L level or H level in response to the height of the signal voltage corresponding to the temperature of the heating element, to operate a relay winding Ry through a thyristor $Q_2$ so as to open the controlling contacts 12 in the case of the L level or to close the same in the case of the H level. As a result, the temperature of the heating element 21 will be controlled to be within the set range.

Figure 10A:
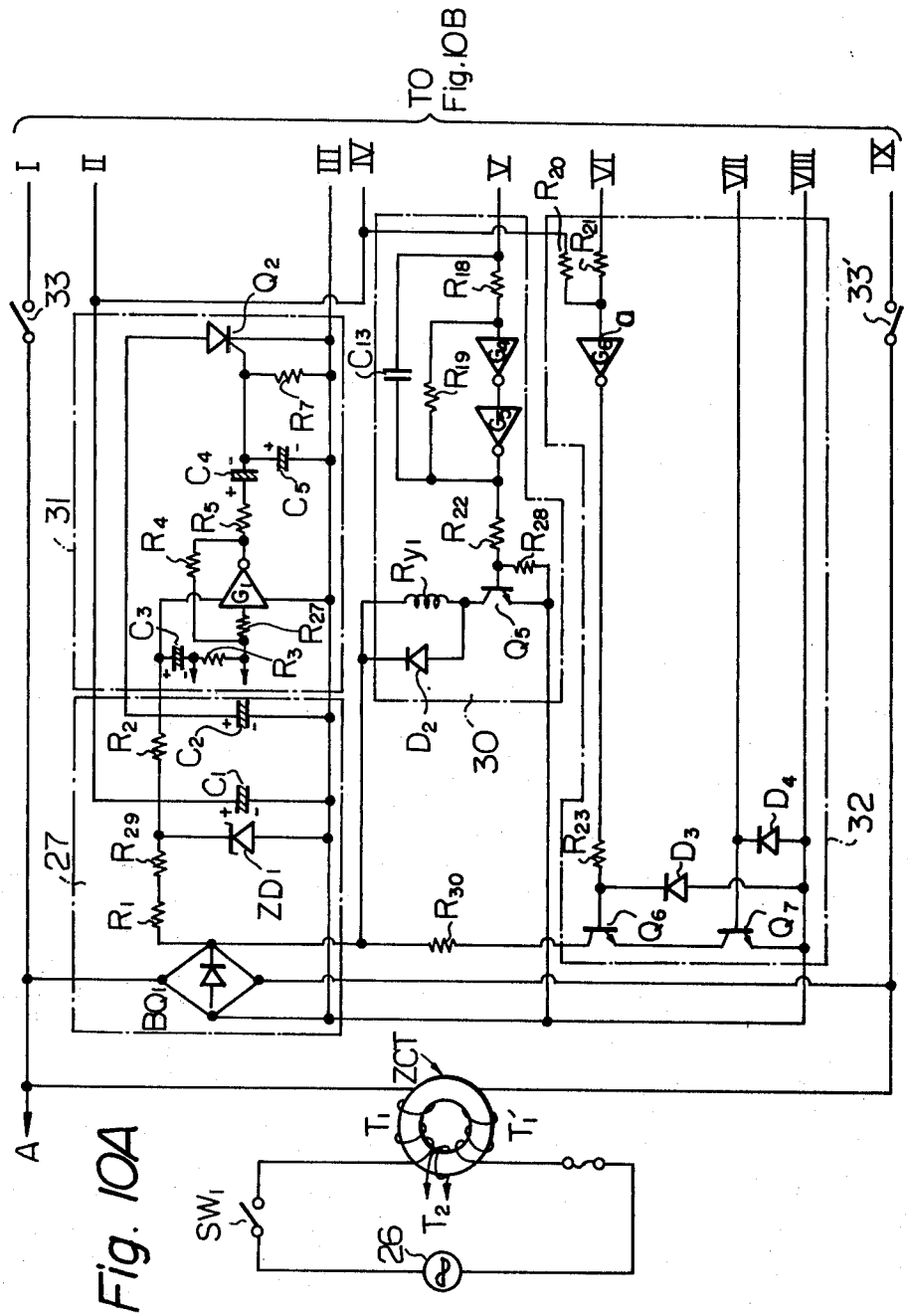
FIG. 10a and 10b is an embodiment in a practical circuit arrangement of the entire system according to the present invention.
Figure 10B:
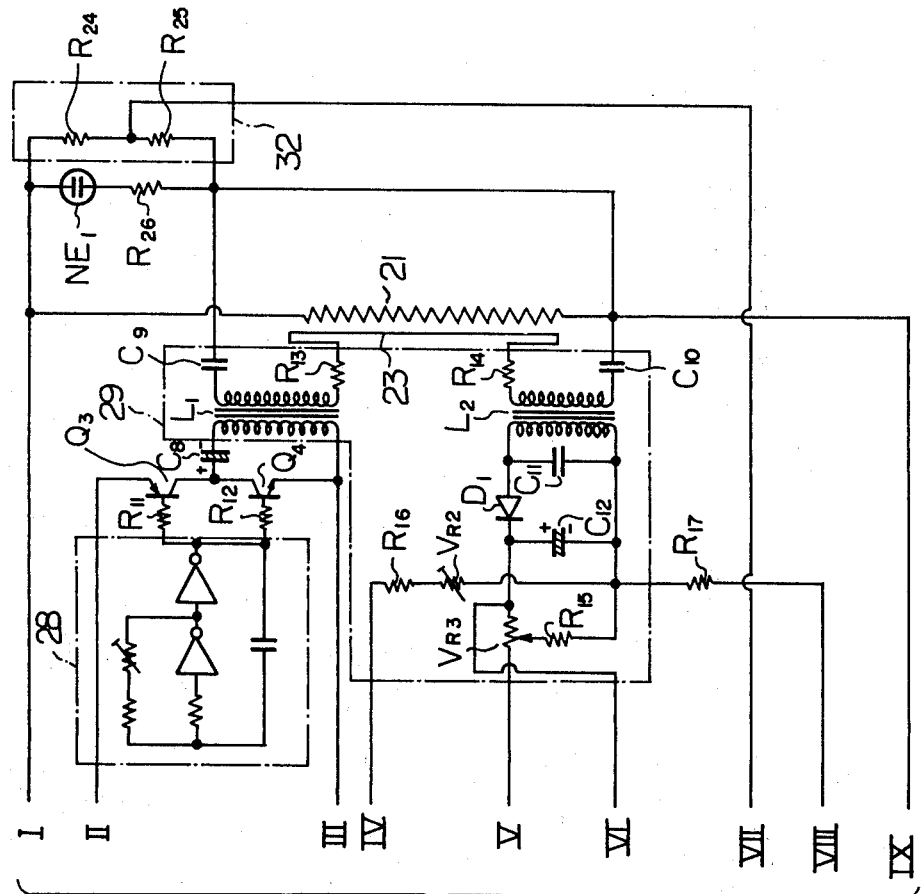

Referring now to the practical embodiment shown in FIG. 10 of the entire system of the present invention, the system comprises an alternating current source 26, direct current source circuit 27, oscillating circuit 28, coupling circuit 29, switching circuit 30, leakage detecting circuit 31 and excess temperature rise preventing circuit 32.

In comparison with the block diagram of FIG. 4, the system of FIG. 10 is additionally provided with the leakage detecting circuit 31 and excess temperature rise preventing circuit 32. Therefore, brief references to these circuits 31 and 32 shall be made in the following.

Referring to the operation of the leakage detecting circuit 31, a zero-phase current transformer ZCT having primary windings $T_1$ and $T_1'$ and a secondary winding $T_2$ is provided so that, when currents flowing to the respective primary windings $T_1$ and $T_1'$ of this transformer ZCT are exactly equal to each other, no voltage will be generated in the secondary winding $T_2$ but, when the metal pin or the like is struck into the heating element 21 or thermosensitive electrode 23 to cause a shock or leak, the currents flowing to the primary windings $T_1$ and $T_1'$ will be unbalanced and a voltage will be generated in the secondary winding $T_2$. This generated voltage will be amplified by an amplifying means including an inverter $G_1$ in the circuit 31 and provided to a capacitor $C_5$ therein. When the plus side terminal voltage of the capacitor $C_5$ rises to a certain value, a silicon controlled rectifier (SCR) $Q_2$ is turned ON, whereby the direct current source circuit 27 will be short-circuited, the source circuit voltage will reduce, the base potential of a transistor $Q_5$ will reduce, thereby the transistor $Q_5$ will be turned OFF, then a relay $Ry_1$ will be turned OFF, and, therefore, controlling contacts 33 and 33' operated by this relay will be opened.

The excess temperature rise preventing circuit 32 is a protective circuit that operates in case the contacts 33 and 33' are fused or at the time of abnormal temperature rise due to any trouble in the switching circuit 30. When the temperature of the heater rises, the potential at an input point a of an inverter $G_6$ will reduce, whereby the output potential of the inverter $G_6$ will become high and a transistor $Q_6$ will be thereby turned ON. As a voltage divided by resistances $R_{24}$ and $R_{25}$ is applied to the base of another transistor $Q_7$, the transistor $Q_7$ will be turned ON. When both transistors $Q_6$ and $Q_7$ are ON, a current will flow through a temperature fuse $R_{30}$ to break this temperature fuse $R_{30}$, whereby the abnormal temperature rise at the heating element due to the fusion of the contacts 33 and 33' or the trouble in the switching circuit 30 can be prevented.

Operations of the oscillating circuit 28, switching circuit 30 and coupling circuit 29 are substantially the same as in the case of FIG. 4 but shall be briefly explained.

The oscillating circuit 28 used in the present instance is a CR oscillating circuit including two-staged gates to which a proper holding current source is connected. The output end of this circuit is connected to the respective bases of transistors $Q_3$ and $Q_4$ respectively through resistances $R_{11}$ and $R_{12}$. These transistors $Q_3$ and $Q_4$ are connected in the push-pull type to form a drive circuit for providing signals to the coupling circuit 29 so that, depending on the output of the oscillating circuit 28, these transistors will cause a current to flow through the primary winding of a transformer $L_1$ of the circuit 29 in the opposite direction to that of a current from the other transistor.

The coupling circuit 29 applies through the transformer $L_1$ between the thermosensitive electrode 23 and the heating element 21 a signal voltage of a different frequency from that of the commercial source current which being the output of the oscillating circuit 28 and, for this purpose, the secondary winding of the transformer $L_1$ is connected at one end to one of the current source lines through a capacitor $C_9$ and at the other end to an end of the thermosensitive electrode 23 through a resistance $R_{13}$. To the other end of the thermosensitive electrode 23, further, an end of the primary winding of another transformer $L_2$ is connected through a resistance $R_{14}$, and this transformer $L_2$ resonates on the secondary side with the signal voltage frequency in cooperation with a parallel resonating capacitor $C_{11}$, while the secondary side of the transformer $L_2$ is arranged to have a sufficiently high resonating impedance as compared with the impedance of the thermosensitive element 22 in the case of the signal voltage frequency. The other end of the primary winding of the transformer $L_2$ is connected through a capacitor $C_{10}$ to the current source lines. The capacitors $C_9$ and $C_{10}$ are to show a low impedance with respect to the signal voltage frequency but a high impedance with respect to the commercial source current frequency. The signal voltage applied between the heating element 21 and the thermosensitive electrode 23 is determined by the divided voltage ratio divided by the resistance value of the resistance $R_{13}$ and impedance of the thermosensitive element 22, and the impedance variations in the element 22 depending on the temperature variations are provided through the transformer $L_2$ to the switching circuit 30 as the signal voltage variations. The set temperature range can be adjusted by means of the resistance $R_{13}$, while any interruption of the input to the transformer $L_2$ due to any disconnection between the thermosensitive electrode 23 and the transformer $L_1$ or the transformer $L_2$ or due to any breakage in the thermosensitive electrode itself, as well as such input interruption due to any short-circuiting between the heating element 21 and the thermosensitive electrode 23, will cause the switching circuit 30 to be actuated to open the control contacts 33 and 33'.

In the switching circuit 30, the output from the coupling circuit 29 is DC-smoothed through a rectifying-smoothing circuit of a diode $D_1$ and capacitor $C_{12}$ and divided by a variable resistance $VR_3$ and resistance $R_{15}$, and this divided voltage is added to a voltage across a resistance $R_{17}$ dividing the DC source voltage to a resistance $R_{16}$ and variable resistance $VR_2$ and provided to the right end of a resistance $R_{18}$, then to the base of a transistor $Q_5$ through a Schmidt circuit comprising series connected inverters $G_4$ and $G_5$ and resistances $R_{18}$ and $R_{19}$ parallel to these inverters. When the temperature of the heating element 21 exceeds the upper set level, the secondary voltage level of the transformer $L_2$ reduces, and an input to the resistance $R_{18}$ thus reduces, whereby the output of the Schmidt circuit is made to be on the L level and the base voltage of the transistor $Q_5$ reduces, the transistor $Q_5$ will be turned OFF, the current of the relay $Ry_1$ will be interrupted and the controlling contacts will be opened. When the temperature becomes below the lower set level, the base voltage of the transistor $Q_5$ rises, to the contrary to the above, whereby the transistor $Q_5$ is turned ON to actuate the relay $Ry_1$ and to close the control contacts, and the current supply to the heating element is performed again.

Thus, in the present invention, a signal of a frequency different from the commercial source current frequency is applied between the thermosensitive electrode and the heating element opposed with each other through the thermosensitive element and the impedance variation depending on the temperature of the thermosensitive element is detected on the basis of this signal. Therefore, the temperature being generated by the heating element can be detected without being influenced by the voltage alternatingly applied to the thermosensitive electrode coupled to the heating element through the thermosensitive element by the commercial source current voltage applied to the heating element. The variation in the signal voltage can be detected also with respect to the short-circuit between the thermosensitive electrode and a part of the heating element in the same potential as the voltage applied to the thermosensitive electrode by the commercial current source, or with respect to the local abnormal temperature rise due to the external heat insulation.

Also, the present invention is applicable not only to the surface type but also to any similar type heaters in which the heating elements are set centrally and covered by the thermosensitive electrodes through the thermosensitive element disposed between them, such as electric blankets.

What is claimed is:

1. A temperature control system for electric surface heater formed of piled layers of a heating element and a thermosensitive electrode, said heating element being connected at both ends to a commercial alternating current source, the system comprising a direct current source circuit generating a direct current with a commercial alternating current applied thereto from said alternating current source, an oscillating circuit generating an alternating current of a frequency higher than that of said commercial alternating current with said direct current from said direct current source circuit, a coupling circuit applying said alternating current of the higher frequency from said oscillating circuit between said heating element and said thermosensitive electrode of the heater as a signal voltage, and a switching circuit detecting any variation in the impedance between the heating element and the thermosensitive electrode and opening a contact inserted between the heating element and the commercial alternating current source at a set level of said detected impedance.

2. A temperature control system according to claim 1 wherein said coupling circuit applies said higher frequency signal voltage to said thermosensitive electrode at an optional part thereof.

3. A temperature control system according to claim 1 wherein said coupling circuit applies said higher frequency signal voltage to said thermosensitive electrode at an end thereof.

4. A temperature control system according to claim 1 wherein said signal voltage from said oscillating circuit is of a frequency of 500 to 1,000 Hz.

5. A temperature control system according to claim 1 wherein said coupling circuit comprises a transformer for isolating outputs from said oscillating circuit and a resistance and capacitor connected between the secondary side of said transformer and said heating element and thermosensitive electrode.

6. A temperature control system according to claim 1 wherein said switching circuit receives an input signal through an isolating transformer connected on the primary side between said heating element and said thermosensitive electrode and forming on the secondary side a filter.

7. A temperature control system according to claim 1 which further comprises a zero phase current transformer connected between said commercial alternating current source and the heating element, and a leakage detecting circuit detecting voltage generated at the secondary winding of said zero phase current transformer and short-circuiting said direct current source circuit depending on said detected voltage at the secondary winding.

8. A temperature control system according to claim 1 which further comprises an excess temperature preventing circuit comprising a first transistor which is conducted upon any abnormal temperature rise in said heating element by means of a signal responsive to said impedance variations between said heating element and said thermosensitive electrode, a second transistor conducted upon conducting state of said switching circuit, a resistance connected in series with said first and second transistors and receiving said direct current, and a fusing means inserted between said commercial AC source and said heating element to be fused upon a temperature rise of said resistance.

9. A temperature control system of electric surface heater comprising a heating element to which a commercial AC source current is applied, a thermosensitive electrode disposed to oppose said heating element through a thermosensitive element of which impedance varies depending on generated heat of the heating element, a signal generating means for applying between the heating element and said thermosensitive electrode a signal different from said commercial AC source current, means for selectively detecting voltage variations in said different signal depending on said impedance variations, and means for controlling voltages of the source current responsive to signals from said selective detecting means.

* * * * *